United States Patent [19]

Reed et al.

[11] Patent Number: 5,376,389

[45] Date of Patent: *Dec. 27, 1994

[54] HARD COATED CHEWING GUM WITH IMPROVED SHELF LIFE, WITH XYLITOL AND POLYOL COATINGS

[75] Inventors: Michael A. Reed, Merrillville, Ind.; Lindell C. Richey, Lake Zurich, Ill.; Jeffrey S. Hook, Berwyn, Ill.; Philip G. Schnell, Downers Grove, Ill.

[73] Assignee: Wm. Wrigley Jr. Company, Chicago, Ill.

[*] Notice: The portion of the term of this patent subsequent to Dec. 14, 2010 has been disclaimed.

[21] Appl. No.: 121,775

[22] Filed: Sep. 15, 1993

Related U.S. Application Data

[63] Continuation-in-part of Ser. No. 857,577, Mar. 26, 1992, Pat. No. 5,270,061.

[51] Int. Cl.$^5$ .................................................. A23G 3/30
[52] U.S. Cl. ........................................ 426/5; 426/302; 426/306
[58] Field of Search .................................. 426/3-6, 426/302, 306

[56] References Cited

U.S. PATENT DOCUMENTS

| | | | |
|---|---|---|---|
| 3,973,050 | 8/1976 | Hayashibara et al. | 426/552 |
| 4,105,801 | 8/1978 | Dogliotti | 426/99 |
| 4,127,677 | 11/1978 | Fronczowski et al. | 426/5 |
| 4,146,653 | 3/1979 | Mader et al. | 427/3 |
| 4,556,565 | 12/1985 | Arima et al. | 426/3 |
| 4,623,543 | 11/1986 | Motegi et al. | 426/103 |
| 4,681,766 | 7/1987 | Huzinec et al. | 426/5 |
| 4,717,765 | 1/1988 | Hirao et al. | 536/124 |
| 4,786,511 | 11/1988 | Huzinec et al. | 426/5 |
| 4,792,453 | 12/1988 | Reed et al. | 426/5 |
| 4,828,845 | 5/1989 | Zamudio-Tena et al. | 426/5 |
| 4,840,797 | 6/1989 | Boursier | 424/475 |
| 4,933,188 | 6/1990 | Cherukuri et al. | 426/3 |
| 4,959,225 | 9/1990 | Wong et al. | 426/3 |
| 4,973,486 | 11/1990 | Matsumoto et al. | 426/548 |
| 4,999,058 | 3/1991 | Kawashima et al. | 127/29 |
| 5,017,400 | 5/1991 | Olinger et al. | 426/660 |
| 5,120,551 | 6/1992 | Yatka et al. | 426/3 |
| 5,135,761 | 8/1992 | Dave et al. | 426/5 |
| 5,144,024 | 9/1992 | Pepper et al. | 536/128 |
| 5,160,546 | 11/1992 | Kawashima et al. | 127/60 |
| 5,171,589 | 12/1992 | Richey et al. | 426/5 |
| 5,270,061 | 12/1993 | Reed et al. | 426/5 |

FOREIGN PATENT DOCUMENTS 0390299 10/1990 European Pat. Off. .

(List continued on next page.)

OTHER PUBLICATIONS

Ir. I. H. Blankers, PURAC biochem bv, LACTY ®-A Unique Reduced Calorie Sweetener (Oct., 1992).

(List continued on next page.)

*Primary Examiner*—Jeanette Hunter
*Attorney, Agent, or Firm*—Willian Brinks Hofer Gilson & Lione

[57] ABSTRACT

A dual composition hard coated chewing gum is provided, which exhibits improved long-term shelf stability under storage conditions involving constant exposure to the moisture contained in the atmosphere. The dual composition hard coated chewing gum is ideally suited for pellet chewing gum having pellet shapes which cannot easily be protected from atmospheric moisture by packaging. The dual composition hard coated chewing gum has a gum center which includes a gum base, a bulk portion, and one or more flavoring agents. The dual composition hard coated chewing gum also has an outer coating which includes layers which contain from about 50 to about 100% xylitol; and layers which contain from about 50 to about 100% of a non-xylitol polyol (preferably lactitol, maltitol or sorbitol, with lactitol and maltitol being particularly preferred). A method of preparing the dual composition hard coated chewing gum is also provided. The non-xylitol polyol is preferably applied first, and covered with a xylitol coating.

31 Claims, No Drawings

FOREIGN PATENT DOCUMENTS

| | | |
|---|---|---|
| 53-127858 | 11/1978 | Japan . |
| 67287659 | 10/1992 | Japan . |
| 1253300 | 11/1971 | United Kingdom . |
| WO90/06317 | 6/1990 | WIPO . |
| WO91/07100 | 5/1991 | WIPO . |
| WO92/16542 | 10/1992 | WIPO . |

OTHER PUBLICATIONS

CCA biochem b.v., Application Information, Hard Panned Chewing Gum (undated, 1 page).

CCA biochem b.v., Application Information, Starting Point Formulation for a LACTY ®-containing Chocolate and Chewing Gum (undated, 1 page).

CCA biochem b.v., International Approval Situation For Lactitol (1988) (1 page).

CCA biochem bv, LACTY ®/A New Reduced Calorie Sweetener (undated) (page 5, use in chewing gum).

CCA biochem b.v., Product Data, LACTY ®-M (undated, 1 page).

Ir. C. H. den Uijl, CCA biochem bv. Lacty ®, Properties and Applications of This New Reduced Calorie Sweetener (1987).

(anon.) LACTY ®, A New Bulk Sweetener, Confectionery Production, p. 656 (Sep. 1990).

PURAC biochem, LACTY ® Containing Chewing Gum (undated, 1 page).

PURAC biochem, LACTY ®/A Unique Reduced Calorie Sweetener (undated) (page 5, use in chewing gum).

HARD COATED CHEWING GUM WITH IMPROVED SHELF LIFE, WITH XYLITOL AND POLYOL COATINGS

CROSS-REFERENCE TO RELATED APPLICATION

This is a continuation-in-part of application Ser. No. 07/857,577, filed Mar. 26, 1992, by Michael A. Reed and Ulesses P. Orr, now U.S. Pat. No. 5,270,061.

BACKGROUND OF THE INVENTION

1. Field of the Invention

This invention relates to a hard-coated chewing gum with xylitol and polyol coatings, having an extended shelf life.

2. Discussion of Related Art

This invention relates to a hard-coated chewing gum in which the hard coating is composed of xylitol and another polyol, having an improved coating quality and extended shelf life.

Specifically, this invention relates to a chewing gum in pellet form, having one or more sequentially added coats of xylitol and another polyol. The hard pellets are prepared by coating a gum core with syrups of xylitol and another polyol. The coated gum has improved coating quality and longer shelf life.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol, and hydrogenated starch hydrolysates.

Sugarless xylitol coated pellet gums have become very popular as products are being manufactured in Europe and Canada. The cost of xylitol is quite high, and partial replacement of the xylitol in the coating would be an advantage. Two polyols in the same coating solution cause problems in the coating process, but sequential coating of gum pellets with two solutions, each containing a polyol, one of which is xylitol, was found to be an acceptable process. Parent patent application Ser. No. 07/857,577, filed Mar. 26, 1992, by Ree and Orr, taught sequential coating with a combination of hydrogenated isomaltulose and xylitol.

U.S. Pat. No. 4,792,453, issued Dec. 20, 1988, to Michael A. Reed, Mansukh M. Patel and Vasek J. Kures, discloses a chewing gum having a sugarless chewing gum center coated with a syrup containing hydrogenated isomaltulose. The sugarless center may include various constituents such as water, an insoluble gum base, a bulking agent, a softener, an artificial sweetener, and a flavoring agent. The sugarless chewing gum center of the reference has a water content of less than about 2.5 weight percent, preferably less than about 1.5 weight percent and most preferably less than about 1.0 weight percent. The use of a center having a low water content, is intended to prevent or reduce the tendency of the gum center from being a water donor to the hard coating.

Sugarless gums coated with hydrogenated isomaltulose-containing syrup possess excellent appearance, taste, texture, mouth feel, and other desirable properties of hard coated chewing gums. Also, it has been found that the relatively anhydrous gum center has the capability of pulling moisture from the hydrogenated isomaltulose-containing coating, causing the coating to exhibit superior hardness. This moisture-pulling from the gum center is attributable, in large part, to the use of glycerin as a softener in the gum center. The moisture-pulling effect is the most pronounced in hard coated chewing gums which contain moderate or relatively high amounts of glycerin in the chewing gum center, on the order of from about 5 to about 15 percent by weight of the chewing gum center.

The tendency of glycerin to pull moisture from the hydrogenated isomaltulose-containing coating can operate as a disadvantage in certain pellet-shaped hard coated chewing gums which, due to their shape, are difficult to isolate from a moisture-containing environment by packaging. For example, pellet gum which is shaped like pillows is difficult to protect from moisture because it is difficult to form a good quality, low or non-moisture permeable package which is suitable for these pellets.

Hydrogenated isomaltulose is a monohydrate. If a hydrogenated isomaltulose-containing coating on a pellet gum becomes too dry, e.g. due to the presence of glycerin, the coating becomes more hygroscopic and absorbs moisture from the surrounding atmosphere. This continuous drying and absorption of moisture from the atmosphere reduces the shelf life of the pellet gum by causing the coating to soften and lose its desirable texture, appearance and mouth feel. Thus, the coating itself must be sufficiently shelf stable against moisture absorption so as not to allow the coating to deteriorate during its shelf life.

Commonly assigned U.S. patent application Ser. No. 07/855,251, filed Mar. 23, 1992, by Michael A. Reed and Jeffrey S. Hook, entitled HARD COATED GUM WITH IMPROVED SHELF LIFE, discloses a chewing gum in pellet form which includes a center portion and an outer coating which contains hydrogenated isomaltulose.

Coating with xylitol is described in U.S. Pat. No. 4,105,801, issued Aug. 8, 1978, to Dogliotti; U.S. Pat. No. 4,127,677, issued Nov. 28, 1978, to Fronczowski et al.; U.S. Pat. No. 4,146,653, issued Mar. 27, 1979, to Mader et al.; U.S. Pat. No. 4,681,766, issued Jul. 21, 1987, to Huzinec et al., U.S. Pat. No. 4,786,511, issued Nov. 22, 1988, also to Huzinec et al.; and U.S. Pat. No. 4,828,845, issued May 9, 1989, to Zamudio-Tena et al.

Patents and publications which discuss lactitol include U.S. Pat. No. 3,973,050, issued Aug. 3, 1976, to Hayashibara et al. (foods and drinks containing lactitol as a sweetener); U.S. Pat. No. 4,973,486, issued Nov. 27, 1990, to Matsumoto et al. (formulation of lactitol-containing food); and U.S. Pat. No. 4,999,058, issued Mar. 12, 1991, and U.S. Pat. No. 5,160,546, issued Nov. 3, 1992, both to Kawashima et al. (production of lactitol trihydrate; use in chewing gum, column 6 of each patent); British Patent 1,252,300, Hayashibara, published Nov. 10, 1971 (food materials containing lactitol); PCT published Patent Applications WO 90/06317, published Jun. 14, 1990, and WO 92/16542, published Oct. 1, 1992, both in the names of Heikkilä et al. (preparation of crystalline lactitol and use as sweetening agent; use in chewing gums mentioned at page 1, lines 10–11 of '317 and page 5, line 13 of '542); Ir. I. H. Blankers, PURAC biochem b.v., LACTY®—A UNIQUE REDUCED CALORIE SWEETENER (October, 1992); CCA biochem b.v., Application Information, Hard Panned Chewing Gum (undated, 1 page); CCA biochem b.v., Application Information, Starting Point Formulation for a Lacty ®-containing Chocolate and Chewing Gum (undated, 1 page); CCA biochem b.v., INTERNATIONAL APPROVAL SITUATION FOR LACTITOL (1988) (1 page); CCA biochem b.v., LACTY ®/A NEW REDUCED CALORIE SWEETENER (undated) (page 5, use in chewing gum); CCA biochem b.v., Product Data, LACTY ®-M (undated, 1 page); Ir. C. H. den Uijl, CCA biochem b.v., LACTY ®, PROPERTIES AND APPLICATIONS OF THIS NEW REDUCED CALORIE SWEETENER (1987); (anon.) Lacty ®, A New Bulk Sweetener, CONFECTIONERY PRODUCTION, p. 656 (September 1990); PURAC biochem, LACTY ® CONTAINING CHEWING GUM (undated, 1 page); and PURAC biochem, LACTY ®/A UNIQUE REDUCED CALORIE SWEETENER (undated) (page 5, use in chewing gum).

Patents and publications which discuss maltitol include U.S. Pat. No. 4,556,565, issued Dec. 3, 1985, to Arima et al. (sweetening compositions comprising maltitol); U.S. Pat. No. 4,623,543, issued Nov. 18, 1986, to Motegi et al. (non-hygroscopic candies containing maltitol); U.S. Pat. No. 4,717,765, issued Jan. 5, 1988, to Hirao et al. (production and use of maltitol anhydrous crystals; used in chewing gum in Example 12 in column 13); U.S. Pat. No. 4,840,797, issued Jun. 20, 1989, to Boursier (maltitol coating); U.S. Pat. No. 4,933,188, issued Jun. 12, 1990, to Cherukuri et al. (maltitol sweetening/bulking agent); U.S. Pat. No. 4,959,225, issued Sep. 25, 1990, to Wong et al. (sweetening compositions comprising maltitol); and U.S. Pat. No. 5,120,551, issued Jun. 9, 1992, to Yatka et al. (maltitol syrup); European Patent Publication 0,390,299, published Oct. 10, 1990, in the names of Bakal et al. (foodstuffs containing maltitol); and Japanese Patent Publications 53 (1978)—127,858, published Nov. 8, 1978 in the names of Fukuda et al. (chewing gum which may include maltitol) and 4 (1992)—287,659, published Oct. 13, 1992, in the names of Shigeni et al. (low-calorie sweetener containing maltitol).

Other patents and publications which may be of interest include U.S. Pat. No. 5,017,400, issued May 21, 1991, to Olinger et al. (non-cariogenic sweetener containing xylitol and maltitol; used in chewing gums, see Example I in columns 5-6); U.S. Pat. No. 5,135,761, issued Aug. 4, 1992, to Dave et al. (coated chewing gum with emulsifier subcoat); U.S. Pat. No. 5,144,024, issued Sep. 1, 1992, to Pepper et al. (shelf stable liquid xylitol compositions comprising non-xylitol polyols such as maltitol); U.S. Pat. No. 5,171,589, issued Dec. 15, 1992, to Richey et al. (coated chewing gum polished with colored wax); and PCT published Patent Application WO 91/07100, published May 30, 1991, in the names of Oravainen et al. (hard candy containing xylitol and optionally maltitol or lactitol). See also PCT Patent Application PCT/US92/11195, filed Dec. 23, 1992, in the names of Yatka et al., to be published about June, 1994 (chewing gum containing lactitol).

SUMMARY OF THE INVENTION

This invention is directed to a hard-coated chewing gum such as a pellet chewing gum, whose pellet shape does not lend itself to packaging of a type that would protect the pellets from atmospheric moisture. The hard-coated chewing gum is coated successively (i.e., not simultaneously) with xylitol and another polyol. The other polyol is preferably lactitol or maltitol, but other polyols such as sorbitol may also be used.

Chewing gum pellets are subject to constant exposure to atmospheric moisture during shelf storage. The present invention provides a dual composition hard-coated chewing gum which gives improved coating quality and is shelf stable under these conditions.

According to the present invention, it has been found that lactitol and maltitol (and other polyols) may be used with xylitol in a manner similar to that in which hydrogenated isomaltulose is used with xylitol, according to the teaching in parent patent application Ser. No. 07/857,577, filed Mar. 26, 1992, by Reed and Orr.

The chewing gum of the invention includes a center portion and an dual composition outer coating. The outer coating consists of layers having two compositions. One layer composition is all or primarily xylitol; and the other is all or primarily lactitol or maltitol (or another polyol, such as sorbitol), hereinafter the non-xylitol polyol.

The outer coating preferably contains from about 50 to about 100 weight percent xylitol and the non-xylitol polyol. The outer coating may also include sweeteners, whiteners, colorants, coating adjuvants and flavors.

The total weight of the coating constitutes from about 10 to about 65 weight percent of the coated chewing gum product.

Any conventional chewing gum center formulation may be used for the gum center. Preferably, however, the gum center is sugarless and includes sorbitol, mannitol, xylitol, lactitol, maltitol and/or hydrogenated starch hydrolyzate, and an aqueous sorbitol liquid. The gum center constitutes from about 35 to about 90 weight percent of the chewing gum product.

With the foregoing in mind, it is a feature and advantage of the invention to provide a dual composition hard coated chewing gum which retains its hardness, texture, appearance and mouth feel during shelf storage which involves constant exposure to the atmosphere.

It is also a feature and advantage of the invention to provide a dual composition hard coated shelf-stable chewing gum which does not absorb significant quantities of moisture from the atmosphere.

It is also a feature and advantage of the invention to provide a dual composition hard coated shelf-stable chewing gum which is suitable for pellet gum having pellet shapes which do not lend themselves readily to protective packaging with respect to the atmosphere.

It is also a feature and advantage of the invention to provide a method of making an improved dual composition hard coated shelf-stable chewing gum.

The foregoing and other features and advantages of the invention will become further apparent from the following detailed description. The detailed description is to be construed as illustrative rather than limitative, with the scope of the invention being defined by the appended claims and equivalents thereof.

DETAILED DESCRIPTION

In accordance with the invention, a dual composition hard coated chewing gum is provided which has a dual composition hard outer coating and a softer chewing gum center portion.

As noted in U.S. Pat. Nos. 4,105,801; 4,127,677; 4,146,653; 4,681,766; 4,786,511; and 4,828,845, referred to above, xylitol, a polyol sugar substitute, can be used to coat various types of products, including chewing gum. Xylitol makes a quality coating for chewing gum, and a number of xylitol chewing gum products are currently on the market in the United States and Europe. Although the quality of product is good using a xylitol coating, the cost of xylitol is high.

It has been found, according to the present invention, that lactitol, maltitol and sorbitol are other polyol sugar substitutes that can be used in coating hard gum centers, in combination with xylitol; and in fact, any edible polyol that can be crystallized to form a quality coating on a pellet may be used with xylitol according to this invention. Pure sorbitol may for example be used, although pure sorbitol would not be expected to reduce moisture sorption.

Another option is to first coat the gum center with a combination of sorbitol and hydrogenated starch hydrolyzate (lycasin) or a combination of polyols to obtain a soft coating. A soft coating is like a jelly bean coating and may be done with combinations of polyol solutions and powders of polyol combinations. This soft inner coating may then be coated with a hard shell xylitol coating to obtain a unique product.

By combining a xylitol coating and a non-xylitol polyol coating in this invention, the cost of coating with xylitol can be significantly reduced, while still maintaining some of the advantages of xylitol. Also, by coating a chewing gum pellet with layers of both xylitol and a non-xylitol polyol, both polyols may give a significant shelf life improvement to the pellet gum. Since lactitol, maltitol, and other polyol sugar substitutes are less hygroscopic than xylitol, moisture absorption of the pellet may be reduced, giving extended shelf life to the product in unfavorable storage conditions and packaging problems.

The invention involves first preparing a soft (by comparison to the coating which is to follow) chewing gum center portion, and forming it into gum pellets by conventional means. The pelletized chewing gum centers are then coated with one or more sequentially applied layers of xylitol and non-xylitol polyol coatings.

The xylitol coating may be accomplished in a traditional manner as disclosed by one of the aforementioned U.S. Pat. Nos. 4,105,801; 4,127,677; 4,146,653; 4,681,766; 4,786,511; and 4,828,845. A preferred coating process, applicable to xylitol and to non-xylitol polyols, is described below.

The preferred coating process uses a solution of the material to be applied. The first solution used for coating contains the non-xylitol polyol, which should contain from about 50% non-xylitol polyol solids up to the saturation point of the non-xylitol polyol in the solvent, and preferably from about 60 to about 75 weight percent non-xylitol polyol solids. The second solution used for coating contains xylitol, which should contain from about 50% xylitol solids up to the saturation point of xylitol in the solvent, which is about 85% xylitol solids in the case of a water solvent, and preferably from about 60 to about 75 weight percent xylitol solids. The syrups may comprise xylitol or a non-xylitol polyol dissolved in water or any other food quality solvent in an amount sufficient to yield a hard coating comprising from about 50 to about 100 weight percent xylitol or non-xylitol polyol. More preferably, however, the syrup will comprise an amount of xylitol or non-xylitol polyol sufficient to yield a hard coating comprising greater than about 90 weight percent xylitol or non-xylitol polyol. Furthermore, the syrups and thus the layers of coating may contain both xylitol and a non-xylitol polyol, and they may contain minor quantities of other sugar substitutes such as sorbitol and mannitol in addition to the primary non-xylitol polyol.

Each coating step adds a small amount of xylitol or other polyol, depending on various factors including chiefly the concentration of the xylitol or the non-xylitol polyol in the coating syrup. Each individual coating step adds roughly 1% to the then-current weight of the pellet being coated.

The total amount of these xylitol and non-xylitol polyol coatings may be from about 10% to about 65% by weight of the product obtained by the series of coatings, i.e., after the last coating step, the product contains from about 10% to about 65% xylitol and non-xylitol polyol; and from about 35% to about 90% gum center, by weight of the total product. Reaching this weight of coating will typically require from about 10 to about 65 individual coating steps. A preferred product contains from about 20% to about 50% by weight of combined xylitol and non-xylitol polyol coating, and from about 50 to about 80% gum center.

It is preferred that the layers of non-xylitol polyol be applied first, and after the non-xylitol polyol coatings are completed, coatings of xylitol be applied in a similar fashion over the non-xylitol polyol coatings.

The ratio of non-xylitol polyol to xylitol in the coatings may vary widely, but the ratio is preferably about 1:1.

The dual composition hard outer coating includes layers of xylitol and non-xylitol polyol coatings. Each of the two components of the dual composition hard outer coating (i.e., the xylitol component and the non-xylitol polyol component) may be present as a single layer or as a plurality of layers. The dual composition hard coating may be present in any thickness or amount which is commercially acceptable.

Xylitol is a pentahydric alcohol having the empirical formula $C_5H_{12}O_5$, and a molecular weight of 152.15. Its structural formula is HO—$CH_2$—CHOH—CHOH—CHOH—$CH_2$—OH. Xylitol is a crystalline compound. Its stabile solid form melts at 93°–94.5° C.; the metastable form melts at 61°–61.5° C. The solubility in water of the stabile form is 64.2 grams per 100 grams of solution at room temperature. Its relative sweetness is about 90% of that of sucrose. It is readily digested and is easily metabolized by diabetics. It is commonly used as an oral and intravenous nutrient, as a dietary additive, and in anticaries preparations.

Lactitol and maltitol, preferred for use in the present invention, are both polyols of the empirical formula $C_{12}H_{24}O_{11}$, and are reduced (hydrogenated) lactose and maltose, respectively. Lactitol and maltitol differ from the disaccharide sugars lactose and maltose in that one of the component sugars is reduced Lo a linear polyol structure, rather than the ring structure of the disaccharide sugar. Formal chemical names for lactitol and maltitol are 4-O-($\beta$-galactosyl)-D-glucitol and 4-O-($\alpha$-glucoparanosyl)-D-glucitol, respectively. The structural formula for lactitol is given in British Patent 1,253,300, at page 2; in Ir. I. H. Blankers, PURAC biochem b.v., LACTY ®-A UNIQUE REDUCED CALORIE SWEETENER (October, 1992), at pages 2 and 6; and elsewhere in the LACTY ® trade literature. The structural formula for maltitol is given in U.S. Pat. No. 4,933,188, issued Jun. 12, 1990, to Cherukuri et al., in column 5, and in European Patent Publication 0,390,299, published Oct. 10, 1990, in the names of Bakal et al., at page 3.

Lactitol is available from Purac America, Inc. in the United States, or from PURAC biochem in the Netherlands, under the trademark LACTY®. Maltitol is available from Roquette Corporation. Both materials are obtained in a crystalline powder form and since they are very soluble in water, can form concentrated coating solutions of 60–80% solids at high temperature.

Either the xylitol component, the non-xylitol polyol component, or both components of the coating, may also contain other ingredients such as flavoring agents, artificial sweeteners and dispersing agents, coloring agents, film formers, and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2 to about 1.2 weight percent flavoring agent and preferably from about 0.7 to about 1.0 weight percent flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05 to about 0.3 weight percent and preferably from about 0.10 to about 0.15 weight percent artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1 to about 1.0 weight percent and preferably from about 0.3 to about 0.6 weight percent of the agent.

Coloring agents are preferably added directly to the syrup in the dye or lake form. Coloring agents contemplated by the present invention include food quality dyes. Film formers preferably added to the syrup, include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

The softer chewing gum center includes a water soluble bulk portion, a generally water insoluble chewing gum base and one or more flavoring agents. The water soluble portion dissipates over a period of time during chewing, while the gum base portion remains in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate, ester gums and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate an the like; softeners, including glycerol monostearate and glycerol triacetate; and optional ingredients such as antioxidants, colors and emulsifiers. The gum base constitutes from about 5 to about 95% by weight of the chewing gum center, more typically from about 10 to about 50% by weight of the chewing gum center, and most commonly from about 25 to about 35% by weight of the chewing gum center.

The water soluble portion of the chewing gum center may include softeners, bulk sweeteners, high intensity sweeteners, flavoring agents and combinations thereof. Softeners such as glycerin are added to the chewing gum center in order to optimize the chewability and mouth feel of the gum. The softeners, which are also known as plasticizers or plasticizing agents, constitute from about 0.5 to about 15% by weight of the chewing gum center.

Aqueous sweetener solutions such as those containing sorbitol, hydrogenated starch hydrolysates, syrups of xylitol, lactitol, maltitol, hydrogenated isomaltulose and other polyols, corn syrup and combinations thereof, may also be used as softeners and binding agents in the chewing gum center.

Bulk sweeteners constitute from about 5 to about 90% by weight of the chewing gum center, more typically from about 20 to about 80% by weight of the chewing gum center and most commonly from about 30 to about 60% by weight of the chewing gum center. Bulk sweeteners preferably include sugarless sweeteners and components. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, lactitol, maltitol, hydrogenated isomaltulose, and the like, alone or in combination.

High intensity sweeteners may also be present and are commonly used with sugarless sweeteners. When used, high intensity sweeteners typically constitute from about 0.001 to about 5% by weight of the chewing gum center, preferably from about 0.01 to about 1% by weight of the chewing gum center. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in the chewing gum center. The sweetener may also function in the chewing gum in whole or in part as a water soluble bulking agent. The softener may also provide additional sweetness.

The flavoring agent should generally be present in the chewing gum center in an amount within the range of from about 0.1 to about 15% by weight of the chewing gum center, preferably from about 0.2 to about 5% by weight of the chewing gum center, most preferably from about 0.5 to about 3% by weight of the chewing gum center. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the chewing gum center. Natural and artificial flavoring agents may be combined in any sensorially acceptable fashion.

Optional ingredients such as colors, emulsifiers, pharmaceutical agents and additional flavoring agents may also be included in chewing gum center.

The chewing gum center is generally manufactured by sequentially adding the various chewing gum ingredients to any commercially available mixer known in the art. After the ingredients have been thoroughly mixed, he gum mass is discharged from the mixer and shaped into the desired form such as by extruding into chunks, or casting into pellets.

Generally, the ingredients are mixed by first melting the gum base and adding it to the running mixer. The gum base may alternatively be melted in the mixer. Color and emulsifiers can be added at this time.

A softener such as liquid sorbitol solution can be added next along with syrup and part of the bulk portion. Further parts of the bulk portion may then be added to the mixer. The flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum center has been manufactured and shaped, the xylitol and non-xylitol polyol-containing coatings can be applied. The coating is initially present as a liquid syrup which contains from about 30 to about 80 or 85 weight percent of the coating ingredients previously described herein, and from about 15 or 20 to about 70 weight percent of a solvent such as water. In general, the hard coating process is carried out in a rotating pan. Sugarless gum center tablets to be coated are placed into the rotating pan to form a moving mass.

The material or syrup which will eventually form the hard coating, is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Preferably, the syrup temperature is from about 150° F. to about 170° F. Most preferably, the syrup temperature should be maintained at about 158° F. throughout the process in order to prevent the polyol in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a dual composition hard coated chewing gum product containing about 10 to about 65 weight percent coating. Preferably, the final product will contain from about 20 to about 50 weight percent hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. For example, while the invention is described with respect to hard-coated chewing gum, it will be appreciated that the dual coating process is applicable to coating other food products, such as candies, in which a combined xylitol and non-xylitol polyol coating would have utility.

EXAMPLES

The invention will now be illustrated with Examples, which are not to be construed as imposing limitations on the invention.

Three gum center compositions, having the formulas set out below, were made on production scale equipment and used in the coating tests.

|  | Center Formula A | Center Formula B | Center Formula C |
| --- | --- | --- | --- |
| Sorbitol | 48.06 | 43.64 | 44.06 |

-continued

|  | Center Formula A | Center Formula B | Center Formula C |
|---|---|---|---|
| Base | 33.0 | 33.0 | 33.0 |
| Calcium Carbonate | 13.0 | 13.0 | 13.0 |
| Glycerin | 4.0 | 6.5 | 8.0 |
| Peppermint Flavor | 1.8 | 2.5 | 1.8 |
| Water | — | 0.8 | — |
| Color | — | 0.2 | — |
| Encapsulated aspartame | 0.14 | 0.36 | 0.14 |
| TOTAL | 100.00 | 100.00 | 100.00 |

COMPARATIVE EXAMPLE 1
ALL XYLITOL COATING

Using center formula C, pellets were coated with two xylitol syrups which provided a coating of 91% xylitol, 6.9% gum arabic, 1.2% peppermint flavor, and 0.9% titanium dioxide whitener, then polished with carnauba wax. The first coating solution (used for the first approximately 20 coats) contained an 80% xylitol solids syrup, gum arabic as a 33% aqueous solution, and titanium dioxide. The second coating syrup contained a 75% xylitol solids syrup, gum arabic as a 33% aqueous solution, and titanium dioxide. The second coating solution (used for the last approximately 20 coats) contained half the amount of gum arabic as the first and less xylitol solids, as indicated, but was otherwise the same as the first solution. About 40 coats in total were applied, with half the flavor added at the 5the coat, and other half at the 10th coat. The product, which was 34.5% coating and 65.5% gum center, had a white, crunchy hard shell coating typical of a xylitol coating.

EXAMPLE 2
XYLITOL AND HYDROGENATED ISOMALTULOSE COATING

Using center formula A, pellets were coated with a xylitol syrup and a hydrogenated isomaltulose syrup which provided a coating of 46% xylitol, 48.5% hydrogenated isomaltulose, 3.4% gum arabic, 1.2% peppermint flavor, and 0.9% titanium dioxide, then polished with carnauba wax.

The first coating solution (used for the first approximately 20 coats) contained a 75% hydrogenated isomaltulose solids syrup, gum arabic as a 33% aqueous solution, and titanium dioxide. The second coating syrup contained an 75% xylitol solids syrup, gum arabic as a 33% aqueous solution, and titanium dioxide. The second coating solution (used for the last approximately 20 coats) contained twice the amount of gum arabic as the first and substituted xylitol for hydrogenated isomaltulose, as indicated, but was otherwise the same as the first solution. About 40 coats in total were applied, with half the flavor added at the 5th coat, and other half at the 10th coat, as in Example 1. The product, which was 34.5% coating and 65.5% gum center, had a white, crunchier, harder coating than the xylitol coating of Example 1.

EXAMPLE 3
XYLITOL AND LACTITOL COATINGS

Using center formula A, 2500 grams of pellets were coated with lactitol in the first coating syrup, then xylitol in the second coating syrup. For the first coating syrup a coating solution of 1200 grams of lactitol, 66 grams of gum arabic, 10 grams TiO₂, and 933 grams of water was prepared and heated to boiling, and held at 160° F. During coating, half of 5.5. grams of peppermint flavor was added to each the 12th and 20th coats. With the initial piece weight at 1.04 grams, pellets were coated with lactitol to a piece weight of 1.33 grams for a product which was 21.8% lactitol coating and 78.2% gum center. For the second coating solution, a xylitol coating solution was prepared by mixing 420 grams of xylitol, 38 grams of gum arabic, 10 grams TiO₂, and 236 grams of water. A 1000 gram quantity of the lactitol-coated gum was then coated with the xylitol coating solution a piece weight of 1.58 grams, for a product which was 34.1% lactitol and xylitol coating and 65.9% gum center. The coating was white, slightly crunchier and harder than the xylitol coating of Example 1.

EXAMPLE 4
XYLITOL AND MALTITOL COATINGS

Using center formula B, 1500 grams of pellets were coated with maltitol in the first coating syrup, then xylitol in the second coating syrup. A coating solution of 1200 grams of maltitol, 66 grams of gum arabic, and 933 grams of water was prepared and heated to boiling and held at 160° F. During coating, half of 6.6 grams of flavor was added to each the 9th and 12th coats. With the initial piece weight of 0.94 grams, pellets were coated with maltitol to a piece weight of 1.18 grams, for a product which was 20.3% maltitol coating and 79.7% gum center. The xylitol coating solution was prepared as in Example 3 and used to overcoat 750 grams of the maltitol coated pellet to a piece weight of 1.44 grams, for a product which was 34.7% maltitol and xylitol coating and 65.3% gum center. The coating was white, crunchier and harder than the xylitol coating of Example 1.

MOISTURE SORPTION TESTS

Examples 1–4 above were evaluated in accelerated shelf life tests to determine differences in moisture sorption capabilities. Five pieces of each sample were weighed in a dish and reweighed after storage at a temperature of 85° F. and 75% relative humidity. Percentage moisture gain was as follows:

| MOISTURE GAIN OF POLYOL/XYLITOL COATED GUM PELLETS | | | | |
|---|---|---|---|---|
| Hours stored at | Example | | | |
| 85° F./75% R.H. | 1 | 2 | 3 | 4 |
| 0 | — | — | — | — |
| 7 | 0.05 | 0.038 | 0.015 | 0.053 |
| 24 | 0.40 | 0.046 | −0.002 | 0.056 |
| 31 | 1.01 | 0.039 | 0.011 | 0.037 |
| 49 | 2.64 | 0.051 | 0.025 | 0.043 |
| 55 | 3.25 | 0.024 | −0.008 | 0.035 |
| 120 | 4.18 | 0.020 | −0.880 | 0.028 |
| 127 | 4.39 | 0.013 | −0.017 | 0.011 |

Results show that the dual coated products with hydrogenated isomaltulose, maltitol or lactitol overcoated with xylitol have much lower moisture gain than an all-xylitol product. Previous moisture sorption tests on all xylitol coated gum indicate the center formula has only a minor effect on moisture gain, so the significant reduction in moisture gain is believed to be due to the dual coating of xylitol with hydrogenated isomaltulose, maltitol or lactitol.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

We claim:

1. A dual composition hard coated chewing gum, comprising:
   from about 35 to about 90 weight percent of a gum center, including a bulk portion, a chewing gum base and one or more flavoring agents; and
   from about 10 to about 65 weight percent of an outer coating containing from about 50 to about 100%, by weight, of xylitol and non-xylitol polyol, which comprises at least two sequential layers of from about 50 to about 100%, by weight, of xylitol and from about 50 to about 100%, by weight, of non-xylitol polyol.

2. A dual composition hard coated chewing gum according to claim 1, wherein the layers of non-xylitol polyol are applied before the layers of xylitol.

3. The dual composition hard coated chewing gum of claim 1 or claim 2, wherein the gum base includes an elastomer selected from the group consisting of polyisobutylene, isobutylene-isoprene copolymer, styrene butadiene rubber, natural latexes, and combinations thereof.

4. The dual composition hard coated chewing gum of claim 1 or claim 2, wherein the gum base includes a resin selected from the group consisting of polyvinyl acetate, terpene resins, ester gums, and combinations thereof.

5. The dual composition hard coated chewing gum of claim 1 or claim 2, wherein the gum base includes fats and oils selected from the group consisting of animal fats, vegetable oils, hydrogenated vegetable oils, partially hydrogenated vegetable oils, cocoa butter, and combinations thereof.

6. The dual composition hard coated chewing gum of claim 1 or claim 2, wherein the gum base includes a wax selected from the group consisting of paraffin wax, microcrystalline wax, candelilla, carnauba, polyethylene wax, and combinations thereof.

7. The dual composition hard coated chewing gum of claim 1 or claim 2, wherein the gum base includes a filler component selected from the group consisting of calcium carbonate, magnesium carbonate, talc, dicalcium phosphate, and combinations thereof.

8. The dual composition hard coated chewing gum of claim 1 or claim 2, wherein the gum base includes a softener selected from the group consisting of glycerol monostearate, glycerol triacetate, and combinations thereof.

9. The dual composition hard coated chewing gum of claim 1 or claim 2, wherein layers of the hard outer coating include from about 50 to about 100% xylitol, by weight.

10. The dual composition hard coated chewing gum of claim 1 or claim 2, wherein layers of the hard outer coating include from about 50 to about 100% of a non-xylitol polyol, by weight.

11. The dual composition hard coated chewing gum of claim 1 or claim 2, wherein layers of the hard outer coating include from about 50 to about 100% of a non-xylitol polyol, by weight, selected from the group consisting of lactitol, maltitol and sorbitol.

12. The dual composition hard coated chewing gum of claim 1 or claim 2, wherein layers of the hard outer coating include at least about 90% xylitol, by weight.

13. The dual composition hard coated chewing gum of claim 1 or claim 2, wherein layers of the hard outer coating include at least about 90% of a non-xylitol polyol, by weight.

14. The dual composition hard coated chewing gum of claim 1 or claim 2, wherein layers of the hard outer coating include at least about 90% of a non-xylitol polyol, by weight, selected from the group consisting of lactitol, maltitol and sorbitol.

15. A dual composition hard coated chewing gum, comprising:
   from about 35 to about 90 weight percent of a gum center which includes a gum base, a bulk portion, and one or more flavoring agents; and
   from about 10 to about 65 weight percent of a dual composition hard outer coating which includes sequentially added layers, each layer comprising
   (a) from about 50 to about 100% xylitol by weight;
   or
   (b) from about 50 to about 100% non-xylitol polyol by weight.

16. The dual composition hard coated chewing gum of claim 15, wherein the bulk portion includes a sugarless sweetener selected from the group consisting of sorbitol, mannitol, xylitol, hydrogenated starch hydrolysates, lactitol, maltitol, hydrogenated isomaltulose, and combinations thereof.

17. The dual composition hard coated chewing gum of claim 15, wherein the bulk portion includes a high intensity sweetener selected from the group consisting of sucralose, aspartame, salts of acesulfame, alitame, saccharin and its salts, cyclamic acid and its salts, glycyrrhizin, dihydrochalcones, thaumatin, monellin, and combinations thereof.

18. The dual composition hard coated chewing gum of claim 15, wherein the gum center constitutes from about 50 to about 80 weight percent of the dual composition hard coated chewing gum and the outer coating constitutes from about 20 to about 50 weight percent of the dual composition hard coated chewing gum.

19. The dual composition hard coated chewing gum of claim 15, wherein layers of the hard outer coating include at least about 90% xylitol, by weight.

20. The dual composition hard coated chewing gum of claim 15, wherein layers of the hard outer coating include at least about 90% of a non-xylitol polyol, by weight, selected from the group consisting of lactitol, maltitol and sorbitol.

21. A method of forming a dual composition hard coated chewing gum, comprising the steps of:
   (1) forming a gum center including a bulk portion, a chewing gum base portion, and one or more flavoring agents;
   (2) forming a non-xylitol polyol liquid coating syrup comprising solvent and from about 50 to about 80% non-xylitol polyol, by weight of the non-xylitol polyol liquid coating syrup;
   (3) applying a plurality of coats of the non-xylitol polyol liquid coating syrup to the gum center;
   (4) forming a xylitol liquid coating syrup comprising solvent and from about 50 to about 85% xylitol, by weight of the xylitol liquid coating syrup;
   (5) applying a plurality of coats of the xylitol liquid coating syrup to the non-xylitol polyol-coated gum center; and (6) evaporating the solvent from each coat of the xylitol and non-xylitol polyol liquid coating syrups, prior to applying the next coat;

the number of coats applied in steps (3) and (5) being sufficient to provide a coating constituting of from about 10 to about 65 weight percent of the total coated chewing gum product.

22. The method of claim 21, wherein the xylitol liquid coating syrup comprises at least about 30% xylitol, by weight of the xylitol liquid coating syrup.

23. The method of claim 21, wherein the non-xylitol polyol liquid coating syrup comprises at least about 30% non-xylitol polyol, by weight of the non-xylitol polyol liquid coating syrup.

24. The method of claim 21, wherein the liquid coating syrup further comprises a flavoring agent.

25. The method of claim 21, wherein the liquid coating syrup further comprises a whitener.

26. The method of claim 21, wherein the liquid coating syrup further comprises an artificial sweetener.

27. The method of claim 21, wherein the liquid coating syrup is applied to the chewing gum center by spraying.

28. The method of claim 21, wherein the solvent for the liquid coating syrup comprises water.

29. The method of claim 21, wherein layers of the hard outer coating include a non-xylitol polyol selected from the group consisting of lactitol, maltitol and sorbitol.

30. The method of one of claims 21–29, wherein the layers of non-xylitol polyol coating are applied before the layers of xylitol coating.

31. The method of claim 21, wherein the gum center is coated, in step (3), with a combination of sorbitol and hydrogenated starch hydrolyzate or a combination of polyols to obtain a soft inner coating; and wherein the soft inner coating is coated, in step (5), with a hard shell xylitol coating.

* * * * *